No. 760,439. PATENTED MAY 24, 1904.
A. ERBOR.
LUBRICATOR.
APPLICATION FILED JAN. 26, 1904.
NO MODEL.
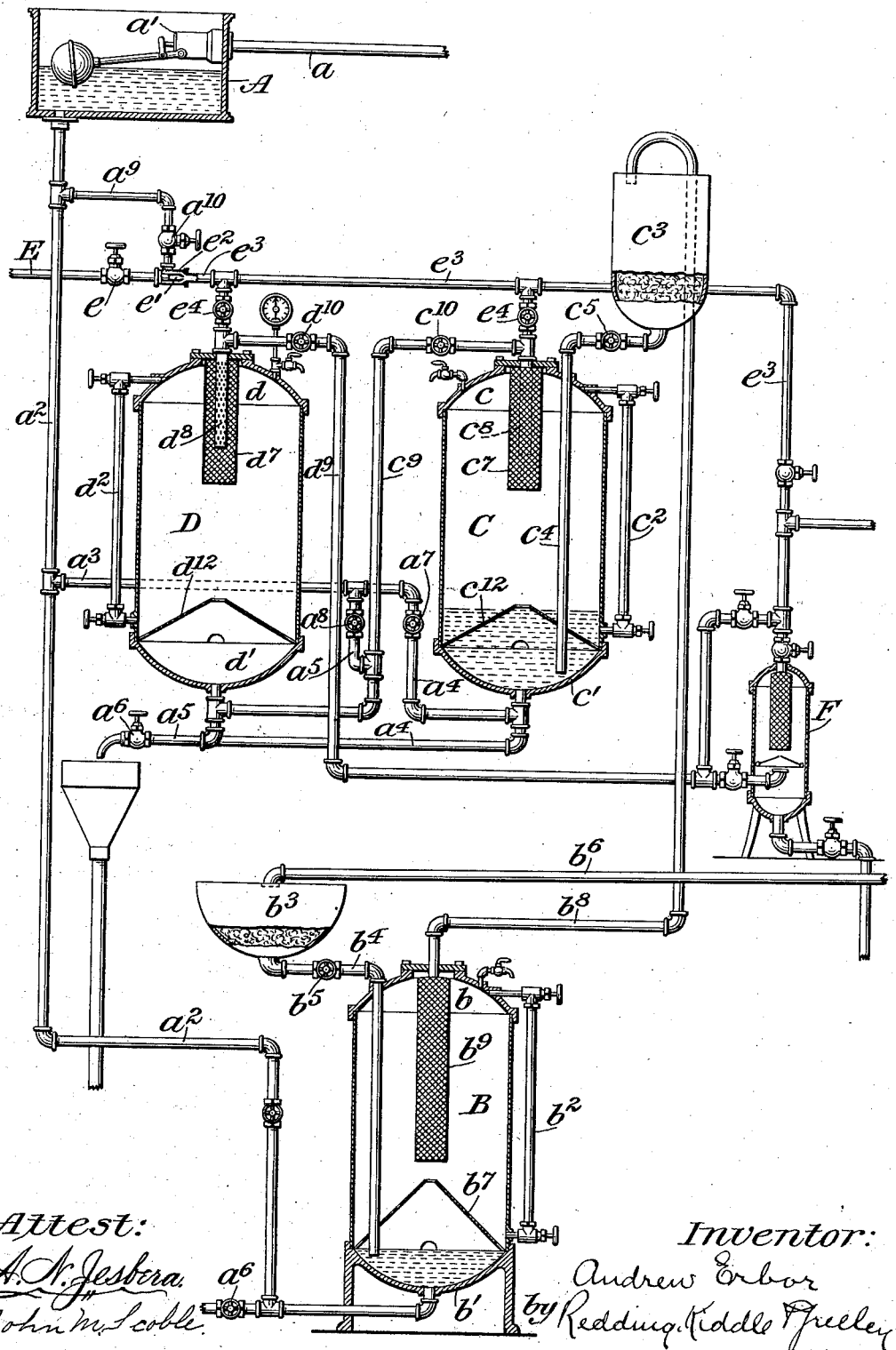
Attest:
A. N. Jesbera
John M. Soble
Inventor:
Andrew Erbor
by Redding, Kiddle & Greeley
Attys.

No. 760,439.

Patented May 24, 1904.

UNITED STATES PATENT OFFICE.

ANDREW ERBOR, OF COPLAY, PENNSYLVANIA.

LUBRICATOR.

SPECIFICATION forming part of Letters Patent No. 760,439, dated May 24, 1904.

Application filed January 26, 1904. Serial No. 190,647. (No model.)

*To all whom it may concern:*

Be it known that I, ANDREW ERBOR, a citizen of the United States, residing in Coplay, county of Lehigh, State of Pennsylvania, have invented certain new and useful Improvements in Lubricators, of which the following is a specification, reference being had to the accompanying drawing, forming a part hereof.

This invention relates to lubricating apparatus of the character of that shown in Letters Patent of the United States Nos. 652,354 and 652,355, granted June 26, 1900, and has for its object to provide improved means for the more efficient cleansing of the apparatus from time to time.

The invention will be more particularly described hereinafter with reference to the accompanying drawing, which represents the improved apparatus partly in elevation and partly in vertical section.

In general construction and arrangement the apparatus is the same as that shown and described in said Letters Patent No. 652,354, with the improvements shown and described in said Letters Patent No. 652,355, and as far as possible like letters of reference are employed in the present application to represent parts similar to or corresponding to the parts represented by the same letters of reference in the said patents. The complete apparatus, however, will be briefly described for convenience in explanation of the present improvements. As described in said Patent No. 652,354, the apparatus comprises a water-tank A to give the required degree of pressure for the movement of the oil through the apparatus, a closed filtering and separating tank B, a second closed filtering and separating tank C, and one or more closed distributing-tanks D, one being shown in the drawing. The water-tank is connected with a convenient water-supply, as by a pipe $a$, and is provided with a float-valve $a'$ for maintaining the water in the tank at a substantially uniform level. Connection is established between the water-tank and the bottoms of the several tanks B, C, and D, as by pipes $a^2$ and $a^3$ and branch pipes $a^4$ and $a^5$. The pipe $a^2$ and the branch pipes $a^4$ and $a^5$ are extended beyond their respective connections with the tanks B, C, and D to permit the contents of the tanks to be drawn off from time to time, such extensions being provided with stop-valves $a^6$. Stop-valves $a^7$ and $a^8$ are also provided in the branch pipes $a^4$ and $a^5$, respectively, to control the admission of water to the tanks. Each of the tanks B, C, and D is constructed and provided with connections and attachments substantially as described in said Letters Patent No. 652,355, the tank B having a rounded top $b$ and rounded bottom $b'$ and a sight-glass $b^2$ and being connected near its bottom with a filter $b^3$ through a pipe $b^4$ and stop-valve $b^5$. The waste oil from the bearings may be delivered through a pipe $b^6$ to the filter $b^3$, from which it passes to the bottom of the tank B and rises through the perforated false bottom $b^7$. A pipe $b^8$, having at its lower end a cylindrical wire screen $b^9$, delivers the oil as it is forced on by the water rising below it in the tank B to the separating-tank C near its bottom through a filter $c^3$ and pipe $c^4$, having a stop-valve $c^5$, the tank C having a rounded top $c$, a rounded bottom $c'$, a sight-glass $c^2$, and perforated false bottom $c^{12}$. A cylindrical screen $c^7$, preferably of wire-gauze, surrounds the end of the delivery-pipe $c^9$ within the upper portion of the tank C, such delivery-pipe $c^9$ being provided with a stop-valve $c^{10}$ and arranged to deliver the oil from the tank C to the tank D near its bottom, the pipe $c^9$ being for convenience connected to the branch pipe $a^5$. The tank D likewise has a rounded top $d$, a rounded bottom $d'$, a sight-glass $d^2$, and a perforated false bottom $d^{12}$. It is likewise provided in its upper portion with a cylindrical wire screen $d^7$, which surrounds the perforated spray-nozzle $d^8$, which is extended within the tank and is connected with the delivery-pipe $d^9$, through which the purified oil is delivered either directly to the place of use or the receptacle placed to receive it or through a final separator F. The spray-nozzle $d^8$ has no special function so far as concerns the separating of the oil, but is provided with particular reference to the cleansing of the apparatus, and, as will be understood, a similar spray-nozzle may be provided in each of the several tanks of the apparatus.

To provide for the more effective cleansing of the apparatus than can be accomplished by the introduction of steam alone, the improved apparatus is constructed and arranged so that a spray of mingled steam and hot water may be introduced with some force into each one of the tanks, as shown in detail with respect to the tank D. For this purpose the steam-pipe E, provided with a stop-valve $e$, is connected with the water-supply, as by a branch pipe $a^9$ from the water-pipe $a^2$, such branch pipe being provided with a stop-valve $a^{10}$. The steam is admitted through a jet or injector nozzle $e'$, located in a chamber $e^2$, to which the water is admitted, so that when steam is turned on the water is driven through the discharge-pipe $e^3$ with considerable force, and a suitable connection with a stop-valve, as at $e^4$, being provided for each tank the mingled steam and water is discharged with force through the spray-nozzle $d^8$ and through the screen $d^7$ and against the walls of the tank, thus quickly and thoroughly cleansing the screen $d^7$ and also the walls of the tank.

It will be understood that the collection, purification, and delivery of waste oil is carried on with this apparatus by suitable manipulation of the several stop-valves, as fully described in said Letters Patent Nos. 652,354 and 652,355, and no further explanation of the mode of using the apparatus is required herein.

I claim as my invention—

1. In a lubricating apparatus, the combination of a tank having a pipe connected near its top, a water connection to said pipe, a steam connection to said pipe, and a jet or injector nozzle, whereby water mingled with steam is driven with force into the tank, substantially as shown and described.

2. In a lubricating apparatus, the combination of a tank having a spray-nozzle within its upper portion, a water connection to said spray-nozzle, a steam connection to said spray-nozzle, and a jet or injector nozzle, whereby water mingled with steam is driven with force into the tank through the spray-nozzle, substantially as shown and described.

3. In a lubricating apparatus, the combination of a tank having a delivery-pipe connected near its top and terminating in a spray-nozzle, a screen surrounding said spray-nozzle, a water connection to said pipe, a steam connection to said pipe, and a jet or injector nozzle, whereby water mingled with steam is driven with force into the tank through said spray-nozzle and said screen, substantially as shown and described.

This specification signed and witnessed this 20th day of January, A. D. 1904.

ANDREW ERBOR.

In presence of—
   CHAS. C. LEISENRING,
   V. Z. KOHLER.